United States Patent [19]
Asano et al.

[11] 3,923,741
[45] Dec. 2, 1975

[54] ACRYLAMID AQUEOUS SOLUTION REFINING PROCESS

[75] Inventors: Shiro Asano, Yokohama; Kiyotaka Yoshimura, Mobara; Ryoji Tsuchiya, Kamakura; Tadatoshi Honda, Yokohama, all of Japan

[73] Assignee: Mitsui Toatsu Chemicals, Incorporated, Tokyo, Japan

[22] Filed: Dec. 5, 1972

[21] Appl. No.: 312,337

[30] Foreign Application Priority Data
Dec. 6, 1971 Japan.............................. 46-97891
Dec. 6, 1971 Japan.............................. 46-97892
Dec. 6, 1971 Japan.............................. 46-97893

[52] U.S. Cl............................................. 260/561 N
[51] Int. Cl.$^2$................................. C07C 103/08
[58] Field of Search................................. 260/561 N

[56] References Cited
UNITED STATES PATENTS

| | | | |
|---|---|---|---|
| 2,734,915 | 2/1956 | Jones...................... | 260/561 N X |
| 2,993,903 | 7/1961 | Kraus...................... | 260/561 N X |
| 3,329,715 | 7/1967 | Strohmeyer et al........... | 260/561 N |

FOREIGN PATENTS OR APPLICATIONS

| | | | |
|---|---|---|---|
| 40-23004 | 10/1965 | Japan.............................. | 260/561 N |
| 38-9267 | 6/1963 | Japan.............................. | 260/561 N |
| 242,880 | 9/1969 | U.S.S.R.......................... | 260/561 N |

*Primary Examiner*—Ethel G. Love
*Attorney, Agent, or Firm*—Clario Ceccon

[57] ABSTRACT

There is disclosed an acrylamide aqueous solution refining process wherein an acrylamide aqueous solution obtained through a catalytic hydration process etc. is distilled to remove acrylonitrile when necessary; then is treated with active carbon, which has been arranged to adsorb cupric ion before use so that the polymerization of acrylamide that tends to take place around active carbon can be prevented thereby; and, if necessary, deionization is carried out by means of ion-exchange resin.

5 Claims, No Drawings

ACRYLAMID AQUEOUS SOLUTION REFINING PROCESS

BACKGROUND OF THE INVENTION

For the industrial manufacture of acrylamide, there are known some new methods whereby acrylamide aqueous solutions are directly obtained by the catalytic hydration reaction of acrylonitrile. Such methods have been disclosed, for example, by U.S. Pat. No. 3,381,034 which employs copper ion; U.S. Pat. No. 3,631,104 which employs copper oxide, copper - chrome oxide, copper - molybdenum oxide, or a copper catalyst obtained by reducing them; U.S. Pat. No. 3,674,848 which employs a copper salt of acid cation-exchange resin etc.; and U.S. Pat. No. 3,679,745 which employs cuprous dihydrogen phosphate. In addition to these methods, there is another method employing such catalysts as Raney copper, Ullmann copper, reduced copper, copper with a carrier, etc. (U.S. Pat. application Ser. No. 56,967, filed July 21, 1970 and owned by the assignee of the patent application.)

Unlike the sulfuric acid process which has conventionally been employed in the industrial manufacture, the crude acrylamide aqueous solution prepared by these new methods does not produce an ammonium sulfate as a by-product, and thus permits obtaining a refined acrylamide aqueous solution through a special refining process or a crystallized product through a further process. However, the crude acrylamide aqueous solution obtained by such a catalytic hydration reaction either discolors or becomes turbid immediately after the manufacturing process, or as time elapses, due to the stabilizer contained in the acrylonitrile, uncleanliness inside the equipment, and a small quantity of impurities produced during the reaction process, etc. It is very important, therefore, to eliminate from the crude acrylamide aqueous solution such discoloration or turbidity that takes place as time elapses. Otherwise the quality of the refined acrylamide aqueous solution or the crystallized product obtained therefrom will be greatly degraded. Furthermore the refining process using treatment with active carbon will be hindered to a great extent.

OBJECT OF THE INVENTION

An object of this invention is to eliminate the discoloration or turbidity of the acrylamide aqueous solution obtained by a catalytic hydration process etc., preventing, at the same time, the discoloration and turbidity from taking place as time elapses, and also to prevent acrylamide polymers from contamination in the acrylamide aqueous solution or crystals obtained.

Another object of this invention is to prevent the polymerization of acrylamide which takes place around active carbon during the process of treatment of an acrylamide aqueous solution with active carbon, so that the refining process using active carbon can be facilitated.

SUMMARY OF THE INVENTION

In accordance with the process of the present invention, the acrylamide aqueous solution obtained by the catalytic hydration process etc. is treated with active carbon which has been allowed to adsorb cupric ion before use. The refined acrylamide aqueous solution or crystallized product obtained in this manner is free from discoloration or turbidity. In addition to this, the invented process prevents the discoloration or turbidity which otherwise takes place as time elapses; prevents acrylamide polymers from contaminating so that the quality of the product can be improved; and also greatly facilitates the process of treatment with active carbon.

Furthermore, in accordance with the process of the invention, an acrylamide aqueous solution obtained as reaction product by a catalytic hydration process etc. is distilled to remove acrylonitrile when necessary before treatment is carried out with active carbon which has been allowed to adsorb cupric ion; and then, if so required, deionization is carried out using an ion exchange resin. This also ensures improvement in the quality of the refined acrylamide aqueous solution or crystals thereof thus obtained.

DETAILED DESCRIPTION OF THE INVENTION

Though granular active carbon is expensive as compared with active carbon powder, the former facilitates continuous processing when used in the form of a packed column. Its use also has other advantages such as good workability and cost reduction in facilities. However, acrylamide is quite readily polymerized around active carbon and thus tends to clog the column. This fact spoils the advantages of granular active carbon.

It is readily conceivable that the polymerization of monomers in general can be prevented by adding a suitable stabilizer to an aqueous solution. This has been proven in a process previously contrived by the present inventors for the manufacture of acrylamide by catalytic hydration reaction. In the aqueous solution which is obtained in accordance with the process, there is a very small amount of copper ion, which serves as stabilizer. However, the degraded quality of products and the hindrance in carrying out the treatment with active carbon as mentioned in the foregoing result from the use of a column filled with new active carbon.

In the present invention, such polymerization of acrylamide is precluded by causing the column to adsorb a stabilizer in a sufficient quantity before use. By this, the concentration of the stabilizer in the acrylamide aqueous solution and the stabilizer adsorption quantity of the active carbon are maintained above a certain level when the acrylamide aqueous solution passes through the column.

Examples of the cupric ion containing compounds that may be employed in the process of the invention include copper salts such as cupric nitrate, cupric chloride, cupric sulfate, cupric acetate, etc. and copper complex salts such as cupric ammine complex salt.

Examples of methods for causing the column to adsorb such cupric ions include a method of continuously passing an aqueous solution of a low concentration of about 70 ppm of copper ion through the column until adsorption comes close to an equilibrium with the solution of 70 ppm concentration. In an example of another method, active carbon is soaked in a high concentration aqueous solution of cupric ion to cause the active carbon to adsorb the ion up to a desired adsorption quantity.

The quantity of the copper ion adsorbed by active carbon depended upon the cupric ion concentration in the aqueous solution applied before use. With an aqueous solution of 70 ppm of cupric ion applied, for example, the adsorption quantity is approximately 0.5 part by weight on the basis of 100 parts by weight of the acive carbon. The adsorption quantity to this degree is sufficient for attaining the effect of this invention. However, the effect of this invention cannot be attained when the adsorption quantity is less than 0.05 part by weight.

The process of the invention principally applies to granular active carbon although it is applicable also to other shapes of active carbon prepared by any manufacturing processes. Powdered active carbon is generally used for a batch suspension process and is used in a small quantity for each process. Unlike the case of the granular active carbon used for a continuous column process, the batch suspension process does not develop such conditions that polymerization readily takes place due to absence of stabilizers in the acrylamide aqueous solution and in active carbon. However, the process of the invention must be used even for powdered active carbon in cases where such active carbon is employed in a continuous column process and the like.

When an aqueous solution containing no stabilizer is allowed to flow continuously through a stabilizer adsorbed column, the stabilizer eventually effuses and this results in a condition under which polymerization tends to take place. However, with cupric ion employed as stabilizer, the rate of effusion is very low. Thus the use of cupric ion permits the flowing of an aqueous solution containing no stabilizer for an increased period of time.

The process of the invention has been contrived in an effort to meet the requirement of the above stated catalytic hydration process and particularly that of the hydration process employing copper catalysts. Indeed, the process of the invention is suitable in application to acrylamide aqueous solution by reacting acrylonitrile with water in the presence of a metallic copper catalyst. However, as is apparent from the principle, it is also advantageously applicable to other processes, and will be effective when employed as an active-carbon treating process in the manufacture of acrylamide aqueous solutions in general including, for example, the acrylamide aqueous solution manufactured by the sulfate method and the acrylamide aqueous solution prepared in accordance with the method disclosed by U.S. Pat. No. 3,673,250 which employs a homogeneous catalyst comprising an organic phosphine and a transition metallic compound.

The effects attainable by the use of the process of the invention are apparent as compared with the results obtained without employing it. Without employing the process of the invention, polymerization takes place around the active carbon in the column and the following disadvantages result:

1. The aqueous solution comes to contain a polymer resulting in a high viscosity liquid, which hinders subsequent processes.
2. Turbidity is caused by an insoluble polymer contaminated in the aqueous solution. This greatly degrades the quality of the product, particularly where the product is in the form of the aqueous solution.
3. The adsorping capability of active carbon is lowered by a jellied polymer sticking inside the column.
4. With the increased sticking of such polymer, the column will be clogged requiring the replacement of active carbon.

Therefore, the refining of acrylamide aqueous solution can be facilitated by the use of the invented process.

In connection with the above stated unique process of the invention for the decolorizing and refining of acrylamide aqueous solutions, the following description illustrates the process for refining the acrylamide-reaction-produced aqueous solution obtained through a catalytic hydration process.

Generally, it is uneconomical to keep the conversion rate of the hydration reaction of acrylonitrile close to 100%. Therefore, the conversion is arranged to be 50% or thereabout in the industrial process, and the non-reacted acrylonitrile is retrieved by distillation for reuse. In the distillation, acrylonitrile and water are obtained as distillates from a three-component acrylonitrile-water-acrylamide system while an acrylamide aqueous solution is obtained as a bottom. However, both the acrylonitrile and the acrylamide are compounds that tend to be thermally polymerized. This requires a polymerization inhibiting distillation method. The present inventors, therefore, conducted researches for such a method, and have found a unique phenomenon that the presence of acrylonitrile rather serves to inhibit the polymerization of acrylamide. Then, they have found a suitable method wherein, with a distilling device consisting of a rectifying column member part and a bottom heating member part employed, the distilland is passed in the presence of a small quantity, 0.1% or so, of acrylonitrile; while a centrifugal thin-film evaporator, is used as in the bottom heating member part in such a way as to remove the small quantity of acrylonitrile by rapid evaporation. For inhibiting polymerization, it is advantageous to lower the temperature by reducing the pressure in the distillation system. For retrieving the acrylonitrile, however, it is not economical to have a high degree of vacuum. The distillation is therefore carried out under pressure normally within an absolute pressure range of 50–300 mmHg.

The raw acrylamide aqueous solution obtained in the above stated manner is treated with active carbon in accordance with the process of the present invention. However, the acrylamide aqueous solution thus treated contains various kinds of metal ions requiring an ion-exchange resin treatment, which is normally carried out as described below.

The metal ions contained in the acrylamide aqueous solution which has been treated with active carbon in accordance with the process of this invention include various ions such as the metal ion deriving from the catalyst employed in the catalytic hydration reaction, the iron ion deriving from the corrosion of the equipment, and the cupric ion which derives from the use of the active carbon treatment process of this invention. These metal ions must be removed. The desired method for removing the metal ions must not only be simple method but also ensure a high degree of removal to meet the requirements for the usage of the acrylamide, such as the facts that copper ion should not exceed 0.01 ppm; and that there should be no polymerization of acrylamide during the process and preclusion of any additional organic components from mixing during the process. The present inventors, therefore, conducted researches for a suitable deionization method and have found that the use of the so-called H-type, which is obtainable through the regeneration of a sulfonic acid type cation exchange resin by means of a dilute acid, is suitable.

Thus, the present invention relates to an acrylamide-aqueous-solution refining process which is characterized in that, in refining acrylamide aqueous solutions with active carbon, the active carbon is arranged to adsorb cupric ion before the use of it; and, although the applicability of the invented process is not limited to such, in cases where an acrylic aqueous solution is in a manufacturing process after having been prepared in the presence of a copper catalyst, the decolorization by the invented process is carried out after the above described distilling process; and then a stable acrylamide aqueous solution can be more effectively obtained by further carrying out the additional process of deionization.

EXAMPLE 1

Raney copper which has been developed by an ordinary method is put in a reactor of 1 liter provided with a stirrer and a catalyst separator. Then, reaction is carried out by continuously supplying the reactor between acrylonitrile, and water from which dissolved oxygen has been removed through a deoxidizing device, and at the rates of 600 and 1400 g/hr respectively. Furthermore, an equivalent to 14 ppm of copper nitrate has been added, as copper ion, to the water before use of it. The approximate composition of the solution obtained through the above stated reaction is: 15% acrylonitrile, 20% acrylamide and 65% water.

This solution is distilled at 160 mmHg (absolute pressure) and at about 65°C using a distillation device consisting of a distillation column member and a bottom heating member equipped with a so-called centrifugal thin-film evaporator as the bottom heating member which has a heat transfer area of 60 cm$^2$ beneath a column filled with about 100 cc of Raschig ring. The solution is supplied from the top of the filled column and is rectified while flowing down the column. The residual acrylonitrile then becomes an acrylamide aqueous solution of about 0.1% and enters the evaporator, where it is concentrated by evaporation with most of the residual acrylonitrile removed and evacuated as a bottom during the residence time of about 10 seconds. In the meantime, acrylonitrile is vaporized and distilled from the column. The vaporized acrylonitrile is then condensed by cooling and is returned to the reaction system. The acrylamide concentration in the crude aqueous solution obtained as a bottom is about 33% while the residual concentration of acrylonitrile is less than 0.01% and the concentration of copper ions is about 70 ppm. According to the results of analysis by polarography, cupric ion presents only a trace while the rest is cuprous ion.

The test results of the crude acrylamide aqueous solutions prepared as described above are as shown below:

1. The crude aqueous solution first presents a slight color and a small degree of turbidity. However, when left intact for one night at room temperature, it comes to show some color and turbidity that seem to be attributable to cupric hydroxide.

2. A crude aqueous solution that has undergone a copper removing treatment with an ion exchange resin, first shows no color and presents a slight turbidity. When it has been left intact for 6 months at room temperature, it comes to present a yellowish brown color. Expressing the change of hue in terms of the so-called APHA, it is about 10 in the initial stage and increases to about 30 when it has been left intact as stated above.

3. Another crude aqueous solution that is immediately treated with powdered active carbon and is further subjected to copper removing treatment with an ion exchange resin and is first colorless and transparent, about 5 in APHA. After having been left intact at room temperature for about 6 months, it is still colorless and transparent retaining the APHA value of about 5.

As is apparent from the results of experiments, the refined acrylamide aqueous solution that has undergone the active carbon treatment and the cation exchange treatment as described in the foregoing, is free from aging coloration.

EXAMPLE 2

A glass column measuring 20 mm in inside diameter and 2 meters in length is filled with 300g (about 680 ml) of granular active carbon. With the column in a vacuum state, water is sucked in from the bottom. Then, the crude aqueous solution described in Example 1 is supplied at a temperature of about 30°C from the top of the column at a rate of 1.2 liters/hr and is discharged from the bottom.

The flow resistance which is 600 mmH$_2$O in the initial stage gradually increases and reaches 3000 mmH$_2$O after 20 hours thus making it difficult to continue the experiment. During this period, there is observed a white colored gel of acrylamide polymer growing in the lower part of the column. Then, 100 ml of methanol is added for test to 10 ml each of the effluents obtained 1, 5, 10, 15 and 20 hours after the start of the flow of the solution (hereinafter will be called "methanol test"). According to the test results, the effluent obtained after 1, 15 and 20 hours present some white tubidity that means the separation of an acrylamide polymer. The copper ion concentration in the effluent obtained in the initial stage is nearly 0.

EXAMPLE 3

Using a new granular active carbon column which is similar to that of Example 2, a copper nitrate aqueous solution containing 70 ppm of copper ion is supplied at 30°C and at a rate of 1.6 liters/hr for 23 hours. The cupric ion concentration in the effluent solution is nearly 0 in the initial stage. However, it reaches 35 ppm after 10 hours and 60 ppm after 23 hours.

The crude acrylamide aqueous solution mentioned in Example 1 is supplied to the column which has been allowed to adsorb copper ion and is discharged from the bottom of the column, at 30°C and at a rate of 1.2 liters/hr.

The flow resistance of the column is 610 mmH$_2$O in the initial stage and increases to 850 mm H$_2$O in 1 hour. However, it remains unchanged for about 5 days thereafter. Meanwhile, the results of the methanol test on the solution flowed out throughout that period indicate no formation of acrylamide polymers.

Following the active carbon column, an ion exchange resin column which is prepared by filling a glass tube measuring 2 cm in diameter and 80 cm in length with 200 cc of a sulfonic acid type cation exchange resin and which is made into the H-type by passing diluted hydrochloric acid for regeneration is directly connected to the active carbon column. Then, the acqueous solution is made to pass through this arrangement. The operation of this is also continuously conducted for 5 days in parallel with that of the active carbon column. With the regeneration by hydrochloric acid carried out once during the operating period, the copper ion content in the aqueous solution is kept about 0.01 ppm while the iron ion content is kept below 0.1 ppm; and there takes lace no polymerization of acrylamide around the ion xchange resin column. No polymer is detected in the queous solution and the operation is stably carried ut. The pH value of the refined aqueous solution obained in this manner is pH 3 to 5 showing a weak acidty due to the ion exchange treatment. Therefore, caus ic soda is added to make it to pH 5.5 or thereabout for torage.

Next, the aqueous solution which has been put in torage is again subjected to the same treatment proess for 8 hours under the same conditions using the ame active carbon column which has previously been ised for 5 days. The flow resistance of the column this ime is about 850 mmH$_2$O which is similar to that of the riginal process, and the effluent is transparent according to the results of the methanol test. It has been thus ound that a solution that contains almost no cupric ons can be supplied for a while to a column that once idsorbed cupric ions.

EXAMPLE 4

With a column prepared in the same manner as in Exımple 3, instead of the copper nitrate aqueous solution, ı copper acetate aqueous solution containing 75 ppm of cupric ion is supplied to the column at 30°C and at ı rate of 1.6 liters/hr for 25 hours. Then, the crude ac-ylamide aqueous solution which is described in Examle 1 is applied to this column in the same manner as lescribed in Example 3. The flow resistance of the col-ımn is in the range of 510 to 590 mmH$_2$O 5 hours after :he start and is stable. The results of the methanol test on the effluent indicate that no polymer is produced :hrough the process.

EXAMPLE 5

Tests are conducted on acrylamide aqueous solutions obtained in accordance with various catalytic hydration processes. Each reaction produced solution is subjected to tests after removing un-reacted acrylonitrile, as required, in the same manner as what is described in Example 1. The catalytic hydration reaction with each catalyst is carried out in the following manner:

Sample 1: A reaction tube made of SUS-27 stainless steel measuring 30 mm in inside diameter and 300 mm in length is filled with 390g (bulk volume: 220 ml) of cupric oxide tablets (manufactured by Nikki Kagaku KK). Then, reduction is carried out at 200°-270°C by flowing hydrogen gas and nitrogen gas at the rates of 200 and 400 ml/min. respectively. By this, a reduced copper catalyst of percent reduction of 98%, as determined from the degree of decrease in quantity, is prepared. After this, acrylonitrile and water are continuously supplied to the reaction tube at the rates of 140 and 690 g/hr. to carry out reaction at 120°C. At the same time, the reacting solution is circulated at a rate of 40 liters/hr. An acrylamide aqueous solution is obtained through this reaction, wherein the rate of conversion from acrylonitrile to acrylamide is 70%.

Sample 2: A reduced copper-chrome catalyst is prepared in the same manner as in the case of Sample 1 with the exception of that 670g of copper-chrome catalyst tablets (N201 manufactured by Nikki Kagaku KK) is employed. Using this catalyst, hydration reaction is carried out in almost the same manner as in the case of Sample 1 to obtain an acrylamide aqueous solution also at almost the same rate of conversion.

Sample 3: Using a reactor (made of SUS-27 stainless steel) of 1 liter equipped with a stirrer and a catalyst separator, 250g of copper powder is put into the reactor. Then, acrylonitrile and water in which 10g of cupric ion is dissolved are continuously supplied to the reactor at the rates of 140 g/hr and 690 g/hr respectively to carry out reaction at 120°C. The rate of conversion from acrylonitrile to acrylamide is 14%.

Sample 4: A commerically available natrium type ion exchange resin called Amberlite IRC-50 (registered trademark) is treated with a cuprous oxide suspension aqueous solution to obtain a cuprous catalyst. Then, using the reactor employed in the case of Sample 3, 200g of acrylonitrile, 300g of water and 100g of the above stated cuprous resin catalyst are put into the reactor to carry out reaction at 120°C for 4 hours in the presence of a slight amount of an antioxidant. The rate of conversion from acrylonitrile to acrylamide is 12%.

Each acrylamide aqueous solution prepared in accordance with the above described method is subjected to tests. Using an active carbon column device which is almost the same as that of Example 2, the aqueous solution is passed through the active carbon column which has been allowed to adsorb cupric ion in a copper nitrate aqueous solution beforehand in the same manner as in Example 3. The flow resistance is measured while the solution passes through the column. The effluent acrylamide aqueous solution is subjected to the methanol test. According to the test results, there is no conspicuous variation in the flow resistance in the same manner as in the case where Raney copper catalyst is employed, and also there is observed no formation of acrylamide polymers.

The acrylamide aqueous solution which has undergone the above described active carbon treatment process is further treated through an ion exchange resin column which has been modified into the H-type. The results obtained through this treatment are almost the same as those of Example 3.

What is claimed is:

1. A process for refining an acrylamide aqueous solution comprising treating said acrylamide aqueous solution with active carbon, said active carbon having been treated previously so as to have at least 0.05 parts by weight of cupric ion per 100 parts by weight of said active carbon.

2. The process of claim 1 wherein said active carbon is granular active carbon.

3. The process of claim 1 wherein said acrylamide aqueous solution is obtained by a catalytic hydration process employing a copper catalyst.

4. The process of claim 3 wherein said acrylamide aqueous solution is a reaction product solution obtained by said catalytic hydration process.

5. The process of claim 4 wherein said acrylamide aqueous solution is prepared by rectifying said reaction product solution in the presence of a small quantity of acrylonitrile, and then by carrying out a rapid evaporation of the thus rectified solution to remove said acrylonitrile.

* * * * *